United States Patent
Kim et al.

(10) Patent No.: US 9,357,489 B2
(45) Date of Patent: May 31, 2016

(54) METHOD FOR POWER SAVE MODE OPERATION IN WIRELESS LOCAL AREA NETWORK AND APPARATUS FOR THE SAME

(75) Inventors: Suh Wook Kim, Anyang-si (KR); Yong Ho Seok, Anyang-si (KR); Bong Hoe Kim, Anyang-si (KR); Dae Won Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 224 days.

(21) Appl. No.: 13/991,822

(22) PCT Filed: Oct. 27, 2011

(86) PCT No.: PCT/KR2011/008097
§ 371 (c)(1),
(2), (4) Date: Jun. 5, 2013

(87) PCT Pub. No.: WO2012/077908
PCT Pub. Date: Jun. 14, 2012

(65) Prior Publication Data
US 2013/0258932 A1    Oct. 3, 2013

Related U.S. Application Data

(60) Provisional application No. 61/420,330, filed on Dec. 7, 2010, provisional application No. 61/424,680, filed on Dec. 20, 2010.

(51) Int. Cl.
*H04W 52/02* (2009.01)
*H04W 74/04* (2009.01)
(Continued)

(52) U.S. Cl.
CPC ...... *H04W 52/0225* (2013.01); *H04W 52/0229* (2013.01); *H04W 8/26* (2013.01);
(Continued)

(58) Field of Classification Search
CPC . H04W 52/02; H04W 52/0216; H04W 74/04; H04W 28/04; H04W 74/06; H04L 1/1685; H04L 12/403
USPC .................................. 370/311, 345, 346, 449
See application file for complete search history.

(56) References Cited

U.S. PATENT DOCUMENTS

| | | |
|---|---|---|
| 2005/0009512 A1* | 1/2005 | Rue ............................... 455/420 |
| 2006/0187864 A1* | 8/2006 | Wang et al. ................... 370/311 |
| 2006/0187876 A1* | 8/2006 | Schmidl et al. ............... 370/328 |

FOREIGN PATENT DOCUMENTS

| | | |
|---|---|---|
| KR | 1020050024760 A | 3/2003 |
| KR | 10-2004-0075482 A | 8/2004 |

(Continued)

*Primary Examiner* — Ronald B Abelson
(74) *Attorney, Agent, or Firm* — Dentons US LLP

(57) ABSTRACT

A method for a power save mode operation in a wireless local area network (WLAN) system is provided. The method includes transmitting, by an access point (AP), a traffic indication map (TIM) element that announces existence of buffered traffic, wherein the TIM element includes an association ID (AID) assigned to a buffered STA having the buffered traffic when the buffered station (STA) is associated with the AP; receiving, by the AP, a poll frame for requesting data frame transmission from a candidate STA, wherein the poll frame contains an AID of the candidate STA and a medium access control (MAC) address which is a unique identifying information of the candidate STA; and determining, by the AP, whether the candidate STA is the buffered STA on the basis of the AID and the MAC address of the candidate STA.

12 Claims, 12 Drawing Sheets

(51) Int. Cl.
*H04W 74/06* (2009.01)
*H04W 28/04* (2009.01)
*H04L 1/16* (2006.01)
*H04L 12/403* (2006.01)
*H04W 8/26* (2009.01)
*H04W 24/00* (2009.01)
*H04W 48/08* (2009.01)
*H04W 84/12* (2009.01)

(52) U.S. Cl.
CPC .............. *H04W 24/00* (2013.01); *H04W 48/08* (2013.01); *H04W 74/06* (2013.01); *H04W 84/12* (2013.01); *Y02B 60/50* (2013.01)

(56) References Cited

FOREIGN PATENT DOCUMENTS

| KR | 10-2008-0066074 A | 7/2008 |
|---|---|---|
| KR | 10-2009-0115479 A | 11/2009 |

* cited by examiner

METHOD FOR POWER SAVE MODE OPERATION IN WIRELESS LOCAL AREA NETWORK AND APPARATUS FOR THE SAME

This application is a 35 USC §371 National Stage entry of International Application No. PCT/KR2011/008097 tiled on Oct. 27, 2011, and claims priority to U.S. Provisional Application Nos. 61/420,330 tiled on Dec. 7, 2010 and 61/424,680 filed on Dec. 20, 2010, all of which are incorporated by reference in their entirety herein.

TECHNICAL FIELD

The present invention relates to a wireless local area network (WLAN) system, and more particularly, to a method for a power save mode operation of a station (STA) and an apparatus supporting the method.

BACKGROUND ART

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate.

The WLAN system supports an active mode and a power save mode as an operation mode of a station (STA). The active mode implies an operation mode in which the STA operates in an awake state capable of transmitting and receiving a frame. On the other hand, the power save mode is supported for power saving of an STA which does not require the active state to receive the frame. An STA supporting the power save mode (PSM) can avoid unnecessary power consumption by operating in a doze mode when it is not a time duration in which the STA can access to its radio medium. That is, the STA operates in the awake state only for a time duration in which a frame can be transmitted to the STA or a time duration in which the STA can transmit the frame.

In the WLAN system, an access point (AP) manages traffic to be transmitted to STAs that operate in the power save mode. A method is required in which, if buffered traffic to be transmitted to a specific STA exists, the AP reports the existence of the buffered traffic to the STA and transmits a frame. Further, when the STA operates in the doze state, a method is required in which the STA determines whether there is buffered traffic for the STA, and if there is buffered traffic for the STA, the STA transitions to the awake state to be able to normally receive the frame.

SUMMARY OF INVENTION

Technical Problem

The present invention provides a method of operating a station (STA) that operates in a power save mode in a wireless local area network (WLAN) system and an apparatus supporting the method.

Solution to Problem

In an aspect, a method for a power save mode operation in a wireless local area network (WLAN) system is provided. The method includes transmitting, by an access point (AP), a traffic indication map (TIM) element that announces existence of buffered traffic, wherein the TIM element includes an association ID (AID) assigned to a buffered STA having the buffered traffic when the buffered station (STA) is associated with the AP; receiving, by the AP, a poll frame for requesting data frame transmission from a candidate STA, wherein the poll frame contains an AID of the candidate STA and a medium access control (MAC) address which is a unique identifying information of the candidate STA; and determining, by the AP, whether the candidate STA is the buffered STA on the basis of the AID and the MAC address of the candidate STA.

The method may further include, if the candidate STA is not the buffered STA, transmitting, by the AP, a poll response frame to the candidate STA in response to the poll frame.

The method may further include, if the candidate STA is the buffered STA, transmitting, by the AP, the data frame for the buffered frame to the candidate STA in response to the poll frame.

The method may further include, upon receiving the poll response frame from the AP, operating, by the candidate STA, by transitioning to a doze state.

The method may further include, upon receiving the data frame from the AP, transmitting, by the candidate STA, an acknowledgement (ACK) frame in response to the data frame, and, operating, by the candidate STA, by tr transitioning to the doze state.

The poll response frame may be an ACK frame for the poll frame.

The poll response frame may be a null data frame.

In another aspect, a wireless apparatus is provided. The wireless apparatus includes a transceiver for transmitting and receiving a radio signal; and a processor operably coupled to the transceiver. The processor is configured for: transmitting a traffic indication map (TIM) element that announces existence of buffered traffic, wherein the TIM element includes an association ID (AID) assigned to a buffered STA having the buffered traffic when the buffered station (STA) is associated with the AP; receiving a poll frame for requesting data frame transmission from a candidate STA, wherein the poll frame contains an AID of the candidate STA and a medium access control (MAC) address which is a unique identifying information of the candidate STA; and determining whether the candidate STA is the buffered STA on the basis of the AID and the MAC address of the candidate STA.

If the candidate STA is not the buffered STA, the processor may further be configured for transmitting a poll response frame for the poll frame to the candidate STA.

If the candidate STA is the buffered STA, the processor may further be configured for transmitting the data frame for the buffered frame to the candidate STA in response to the poll frame.

In still another aspect, a method for a power save mode operation in a wireless local area network (WLAN) system is provided. The method includes receiving, by a station (STA), a traffic indication map (TIM) element that announces existence of buffered traffic, wherein the TIM element includes an association ID (AID) assigned to a buffered STA having the buffered traffic when the buffered STA is associated with an access point (AP); if an AID of the STA is equal to the AID of the TIM element, transmitting, by the STA, a poll frame to the AP in response to the TIM element; and if the STA fails to receive any frame from the AP within a predetermined timeout interval after transmitting the poll frame, operating, by the STA, by transitioning to a doze state.

The method may further include, if the STA receives a poll response frame in response to the poll frame within the timeout interval, operating, by the STA, by transitioning to the doze state.

The method may further include, if the STA receives a data frame in response to the poll frame within the timeout interval, transmitting, by the STA, an ACK frame in response to the data frame, and, operating, by the STA, by transitioning to the doze state.

The method of claim may further include: receiving, by the STA, a poll response frame in response to the poll frame, wherein the poll response frame includes a MAC address of the buffered STA; and if the MAC address of the buffered STA is different from that of the STA, operating, by the STA, by transitioning to the doze state.

The method may further include, if the MAC address of the buffered STA is equal to that of the STA, receiving, by the STA, a data frame from the AP after receiving the poll response frame, and, operating, by the STA, by transitioning to the doze state.

Advantageous Effects of Invention

A method for a power save mode operation according to the present invention can operate a power save mode by distinguishing a buffered station (STA) and a non-buffered STA in a wireless local area network (WLAN) system in which an association identifier (AID) can be assigned in an overlapping manner. Therefore, an access point (AP) can prevent a non-buffered STA having an AID assigned in an overlapping manner from unnecessary data frame transmission, thereby improving overall system throughput.

In the method for the power save mode operation of the present invention, a poll response frame is transmitted to prevent the non-buffered STA from unnecessarily maintaining an awake state. This can prevent the STA from unnecessary power consumption. In addition, since retransmission of the poll frame is prevented, radio resource efficiency depending on unnecessary channel occupation and overall throughput of a WLAN system can be improved.

MODE FOR THE INVENTION

Figure 1:
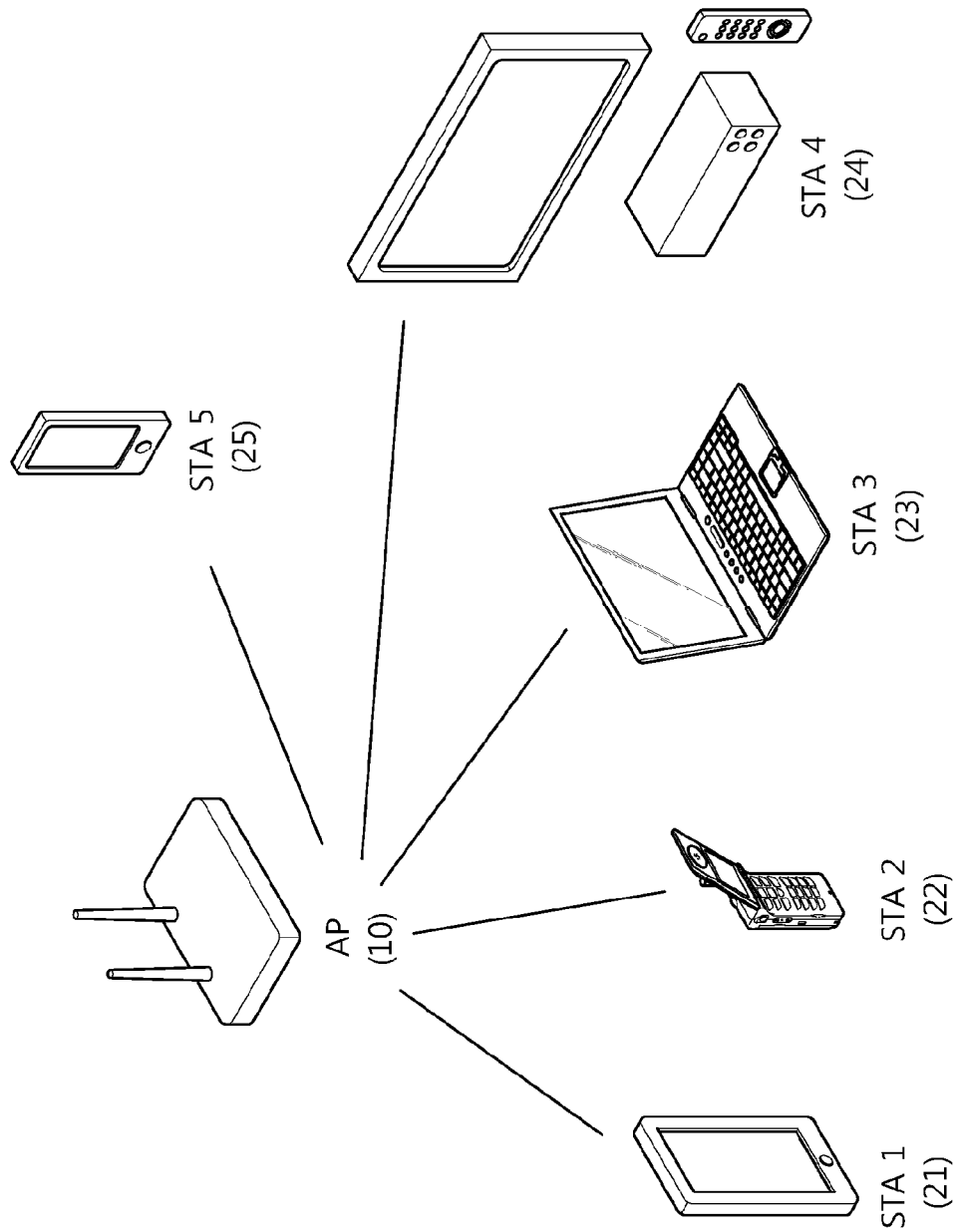
FIG. 1 is a diagram showing the configuration of a WLAN system to which embodiments of the present invention may be applied.

FIG. 1 is a diagram showing the configuration of a WLAN system to which embodiments of the present invention may be applied.

A WLAN system includes one or more Basic Service Set (BSSs). The BSS is a set of stations (STAs) which can communicate with each other through successful synchronization. The BSS is not a concept indicating a specific area An infrastructure BSS includes one or more non-AP STAs STA1, STA2, STA3, STA4, and STA5, an AP (Access Point) providing distribution service, and a Distribution System (DS) connecting a plurality of APs. In the infrastructure BSS, an AP manages the non-AP STAs of the BSS.

On the other hand, an Independent BSS (IBSS) is operated in an Ad-Hoc mode. The IBSS does not have a centralized management entity for performing a management function because it does not include an AP. That is, in the IBSS, non-AP STAs are managed in a distributed manner. In the IBSS, all STAs may be composed of mobile STAs. All the STAs form a self-contained network because they are not allowed to access the DS.

An STA is a certain functional medium, including Medium Access Control (MAC) and wireless-medium physical layer interface satisfying the Institute of Electrical and Electronics Engineers (IEEE) 802.11 standard. Hereinafter, the STA refers to both an AP and a non-AP STA.

A non-AP STA is an STA which is not an AP. The non-AP STA may also be referred to as a mobile terminal, a wireless device, a wireless transmit/receive unit (WTRU), a user equipment (UE), a mobile station (MS), a mobile subscriber unit, or simply a user. For convenience of explanation, the non-AP STA will be hereinafter referred to the STA.

The AP is a functional entity for providing connection to the DS through a wireless medium for an STA associated with the AP. Although communication between STAs in an infrastructure BSS including the AP is performed via the AP in principle, the STAs can perform direct communication when a direct link is set up. The AP may also be referred to as a central controller, a base station (BS), a node-B, a base transceiver system (BTS), a site controller, etc.

A plurality of infrastructure BSSs including the BSS can be interconnected by the use of the DS. An extended service set (ESS) is a plurality of BSSs connected by the use of the DS. APs and/or STAs included in the ESS can communicate with each another. In the same ESS, an STA can move from one BSS to another BSS while performing seamless communication.

In FIG. 1, an association ID (AID) can be assigned to each of STAs 21, 22, 23, 24, and 25 while the STAS are associated with an AP 10. The AID is used uniquely in one BSS. For example, in a current WLAN system, the AID can be given to any one of values 1 to 2007. In this case, for the AID, 14 bits can be assigned to a frame transmitted by the AP and/or the STA, and the AID value can be given to up to 16383. In this case, 2008 to 16383 may be reserved.

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. In this type of access mechanism, an AP and/or an STA senses a wireless channel or medium before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration for medium access.

The CSMA/CA mechanism also includes virtual carrier sensing in addition to physical carrier sensing in which the AP and/or the STA directly senses the medium. The virtual carrier sensing is designed to compensate for a problem that can occur in medium access such as a hidden node problem. For the virtual carrier sending, the MAC of the WLAN system uses a network allocation vector (NAV). The NAV is a value transmitted by an AP and/or an STA, currently using the medium or having a right to use the medium, to anther AP or another STA to indicate a remaining time before the medium returns to an available state. Therefore, a value set to the NAV corresponds to a period reserved for the use of the medium by an AP and/or an STA transmitting a corresponding frame.

An IEEE 802.11 MAC protocol, together with a DCF, provides a Hybrid Coordination Function (HCF) based on a Point Coordination Function (PCF) in which a reception AP or a reception STA or both periodically poll a data frame using the DCF and a polling-based synchronous access scheme. The HCF includes Enhanced Distributed Channel Access (EDCA) in which a provider uses an access scheme for providing a data frame to a number of users as a contention-based scheme and HCF Controlled Channel Access (HCCA) employing a non-contention-based channel access scheme employing a polling mechanism. The HCF includes a medium access mechanism for improving the Quality of Service (QoS) of a WLAN and can transmit QoS data both in a Contention Period (CP) and a Contention-Free Period (CFP).

Meanwhile, if channel sensing is always performed for frame transmission and reception, it causes persistent power consumption of the STA. Since power consumption in a reception state is not much different from power consumption in a transmission state, if the reception state needs to be continuously maintained, relatively great power consumption is generated in an STA that operates by using a battery. Therefore, when the STA senses a channel by persistently maintaining a reception standby state in a WLAN system, ineffective power consumption may be caused without a special synergy effect in terms of a WLAN throughput, and thus it may be inappropriate in terms of power management.

To compensate for the problem above, the WLAN system supports a power management (PM) mode of the STA. A power management (PM) mode of a STA is classified into an active mode and a power save (PS) mode in a WLAN system. Basically, the STA operates in the active mode. When operating in the active mode, the STA can operate in an awake state so that a frame can be received all the time.

When operating in the PS mode, the STA operates by transitioning between a doze state and the awake state. When operating in the doze state, the STA operates with minimum power, and does not receive a radio signal, including a data frame, transmitted from an AP. In addition, the STA operating in the doze state does not perform channel sensing.

The longer the STA operates in a doze state, the less the power consumption is, and thus the longer the STA operates. However, since a frame cannot be transmitted and received in the doze state, the STA cannot operate long unconditionally. If the STA operating in the doze state has a frame to be transmitted to the AP, the STA can transition to an awake state to transmit the frame. However, if the AP has a frame to be transmitted to the STA operating in the doze state, the STA cannot receive the frame and cannot know that there is the frame to be received. Therefore, the STA may need to know whether there is the frame to be transmitted to the STA, and if the frame exists, may require an operation for transitioning to the awake state in accordance with a specific period. According to this operation, the AP can transmit the frame to the STA. This will be described with reference to FIG. 2.

Figure 2:
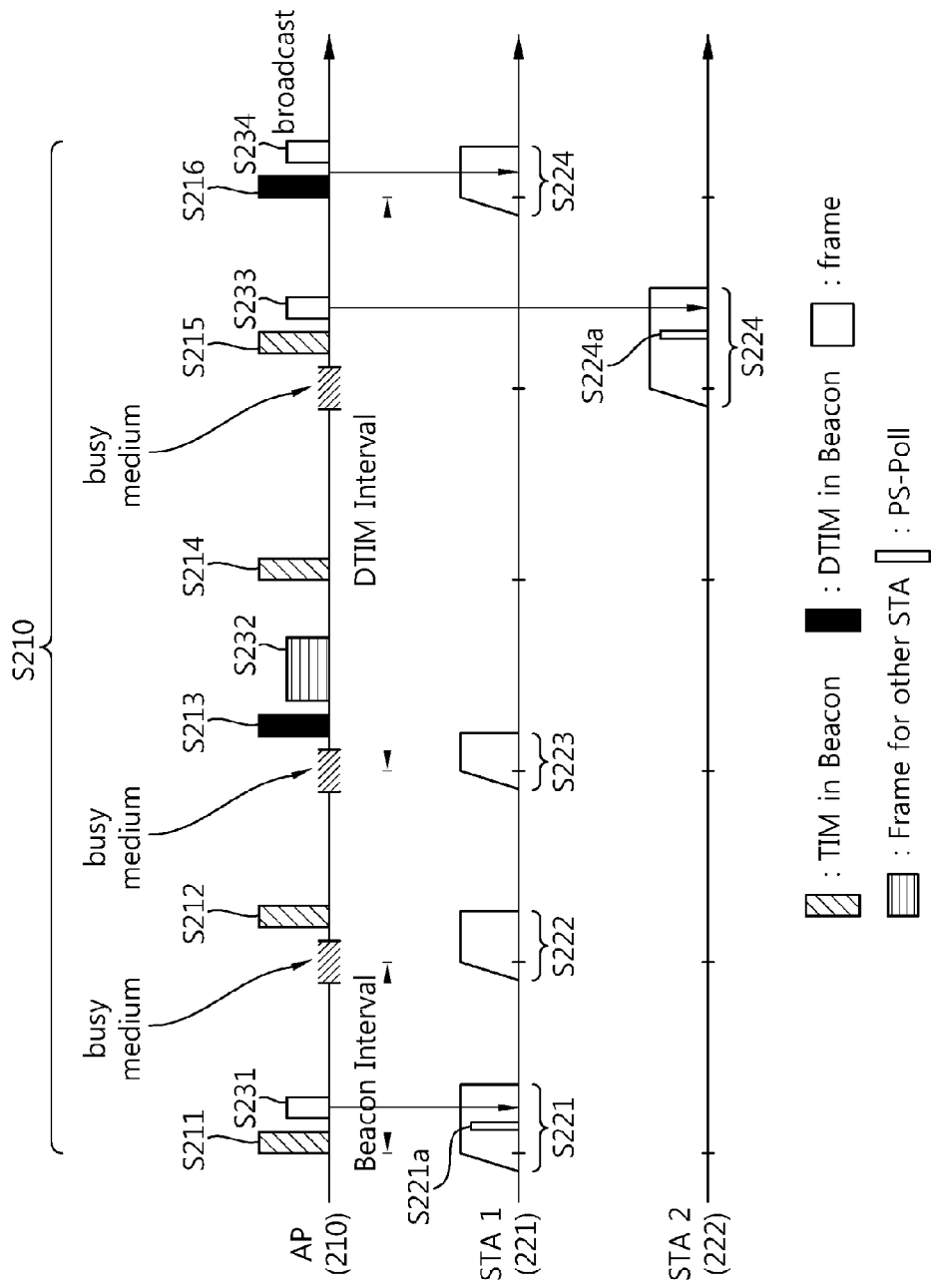
FIG. 2 shows an example of a power management operation.

FIG. 2 shows an example of a power management operation.

Referring to FIG. 2, an AP 210 transmits a beacon frame to STAs in a BSS in accordance with a specific period (step S210). The beacon frame includes a traffic indication map (TIM) information element. The TIM element includes information for reporting that the AP 210 has buffered traffic for which the STAs associated with and a frame will be transmitted. Examples of the TIM element include a TIM used to report a unicast frame and a delivery traffic indication map (DTIM) used to report a multicast or broadcast frame.

The AP 210 transmits the DTIM one time whenever a beacon frame is transmitted three times.

An STA1 221 and an STA2 222 are STAs operating in a PS mode. The STA1 221 and the STA2 222 can be configured such that they can transition from a doze state to an awake state in every wakeup interval of a specific period to receive the TIM element transmitted by the AP 210.

A specific wakeup interval can be configured such that the STA1 221 transitions to the awake state in every beacon interval to receive the TIM element. Therefore, the STA1 221 transitions to the awake state (step S221) when the AP 210 transmits a first beacon frame (step S211). The STA1 221 receives the beacon frame and acquires the TIM element. If the acquired TIM element indicates that there is a frame to be transmitted to the STA1 221, then the STA1 221 transmits to the AP 210 a PS poll frame that requests the AP 210 to transmit a frame (step S221a). The AP 210 transmits the frame to the STA1 221 in response to the PS poll frame (step S231). Upon completion of frame reception, the STA1 221 operates by transitioning back to the doze state.

When the AP 210 transmits a second beacon frame, a medium is busy, that is, another device accesses to the medium for example. Thus, the AP 210 may not be able to transmit the beacon frame in accordance with a correct beacon interval but may transmit it at a delayed time point (step S212). In this case, the STA1 221 switches its mode to the wake state in accordance with the beacon interval, but cannot receive the beacon frame transmitted with delay, and thus transitions back to the doze state (step S222).

When the AP 210 transmits a third beacon frame, the beacon frame may include a TIM element which is configured as a DTIM. However, since the medium is busy, the AP 210 transmits the beacon frame with delay (step S213). The STA1 221 operates by transitioning to the awake state in accordance with the beacon interval, and can acquire the DTIM by using the beacon frame transmitted by the AP 210. The DTIM acquired by the STA1 221 indicates that there is no frame to be transmitted to the STA1 221 and there is a frame for another STA. Therefore, the STA1 221 operates by transitioning back to the doze state. After transmitting the beacon frame, the AP 210 transmits the frame to a corresponding STA (step S232).

The AP 210 transmits a fourth beacon frame (step S214). However, since the STA1 221 cannot acquire information indicating that there is buffered traffic for the STA1 221 by receiving the TIM element two times, the STA1 221 may regulate a wakeup interval for receiving the TIM element. Alternatively, if signaling information for regulating a wakeup interval value of the STA1 221 is included in the beacon frame transmitted by the AP 210, the wakeup interval value of the STA1 221 may be regulated. Instead of transitioning an operation state for every beacon interval to receive the TIM element, the STA1 221 can be configured in the present embodiment such that the operation state is transitioned one time for every three beacon intervals. Therefore, the STA1 221 cannot acquire a corresponding TIM element since the AP 210 transmits the fourth beacon frame (step S214), and maintains the doze state when a fifth beacon frame is transmitted (step S215).

When the AP 210 transmits a sixth beacon frame (step S216), the STA1 221 operates by transitioning to the awake state, and acquires the TIM element included in the beacon frame (step S224). The TIM element is a DTIM that indicates existence of a broadcast frame, and thus the STA1 221 receives the broadcast frame transmitted by the AP 210 (step S234) instead of transmitting a PS poll frame to the AP 210.

Meanwhile, the wakeup interval assigned to the STA2 222 may have a longer period than that of the STA1 221. Therefore, the STA2 222 can receive the TIM element by transitioning to the awake state (step S225) when the fifth beacon frame is transmitted (step S215). The STA2 222 knows existence of a frame to be transmitted to the STA2 222 by using the TIM element, and transmits a PS poll frame to the AP 210 to request transmission (step S225*a*). The AP 210 transmits a frame to the STA2 222 in response to the PS poll frame (step S233).

In order to operate the PS mode of FIG. 2, the TIM element includes a TIM that indicates whether there is a frame to be transmitted to the STA or a DTIM that indicates whether there is a broadcast/multicast frame. The DTIM may be implemented by configuring a field of the TIM element.

A detailed response procedure of the STA that receives the TIM element can be described below with reference to FIG. 3 to FIG. 5.

Figure 3:
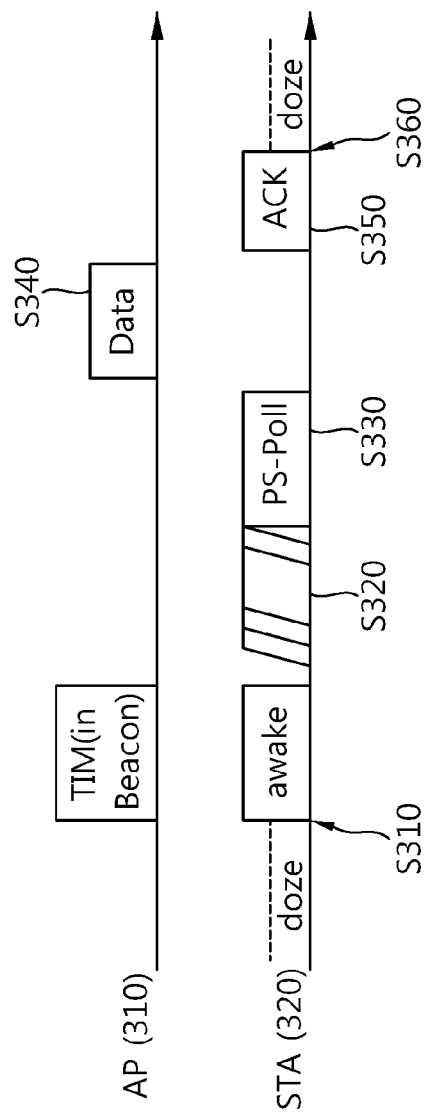
FIG. 3 shows an example of a response procedure of an AP in a TIM protocol.

FIG. 3 shows an example of a response procedure of an AP in a TIM protocol.

Referring to FIG. 3, an STA 320 switches its operation state from a doze state to an awake state to receive a beacon frame including a TIM from an AP 310 (step S310). The STA 320 interprets a received TIM element and thus can know whether there is buffered traffic to be delivered to the STA 320.

The STA 320 contends with other STAs to access to a medium for transmitting a PS poll frame (step S320), and transmits the PS poll frame to request the AP 310 to transmit a data frame (step S330).

Upon receiving the PS poll frame transmitted by the STA 320, the AP 310 transmits a data frame to the STA 320. The STA2 320 receives the data frame, and transmits an acknowledgment (ACK) frame to the AP 310 in response thereto (step S350). Thereafter, the STA2 320 switches its operation mode back to the doze state (step S360).

Instead of immediate response of FIG. 3 in which the data frame is transmitted immediately after receiving the PS poll frame from the STA, the AP may transmit data at a specific time point after receiving the PS poll frame.

Figure 4:
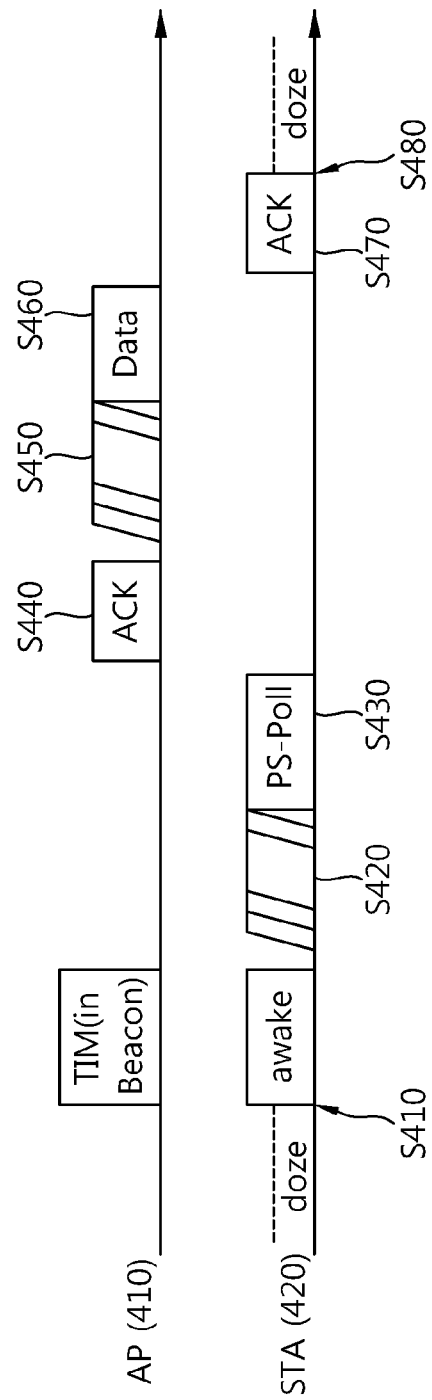
FIG. 4 shows another example of a response procedure of an AP in a TIM protocol.

FIG. 4 shows another example of a response procedure of an AP in a TIM protocol.

Referring to FIG. 4, an STA 420 switches its operation state from a doze state to an awake state to receive a beacon frame including a TIM from an AP 410 (step S410). The STA 420 interprets a received TIM element and thus can know whether there is buffered traffic to be delivered to the STA 420.

The STA 420 contends with other STAs to access to a medium for transmitting a PS poll frame (step S420), and transmits the PS poll frame to request the AP 410 to transmit a data frame (step S430).

If the AP 410 receives the PS poll frame but fails to prepare for a data frame during a specific time interval such as a short inter-frame space (SIFS), instead of directly transmitting the data frame, the AP 410 transmits an ACK frame to the STA 420 (step S440). This is a characteristic of a deferred response which is different from step S340 of FIG. 3 in which the AP 310 directly transmits the data frame to the STA 320 in response to the PS poll frame.

The AP 410 performs contending when the data frame is prepared after transmitting the ACK frame (step S450), and transmits the data frame to the STA 420 (step S460).

The STA 420 transmits an ACK frame to the AP 410 in response to the data frame (step S470), and switches its operation mode to the doze state (step S480).

When the AP transmits a DTIM to the STA, a subsequent procedure of a TIM protocol may differ.

Figure 5:
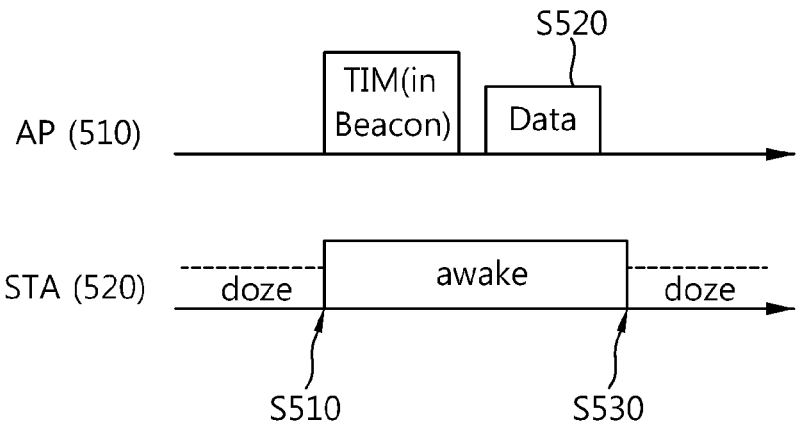
FIG. 5 shows a procedure of a TIM protocol based on a DTIM.

FIG. 5 shows a procedure of a TIM protocol based on a DTIM.

Referring to FIG. 5, an STA 520 switches its operation state from a doze state to an awake state to receive a beacon frame including a TIM from an AP 510 (step S510). The STAs 520 can know that a multicast/broadcast frame will be transmitted by using the received DTIM.

After transmitting a beacon frame including the DTIM, the AP 520 transmits the multicast/broadcast frame (step S520). After receiving the multicast/broadcast frame transmitted by the AP 510, the STAs 520 switch the operation state back to the doze state (step S530).

In the power save mode operation method based on the TIM protocol described with reference to FIG. 2 to FIG. 5, STAs can determine whether there is a data frame to be transmitted for buffered traffic by using STA identifying information included in the TIM element. The STA identifying information may be information related to an association identifier (AID) as an identifier assigned when the STA is associated with an AP. The STA identifying information may be configured to directly indicate AIDs of STAs having buffered traffic or may be configured in a bitmap type in which a bit order corresponding to an AID value is set to a specific value. The STAs can know that there is buffered traffic for them if the STA identifying information indicates their AIDs.

An AID is used uniquely in one BSS, and may be in the range of 1 to 2007 at present. 14 bits are assigned to indicate the AID, and thus the AID can be assigned with up to 16383. In this case, AID values from 2008 to 16383 are reserved.

Meanwhile, machine to machine (M2M) is drawing attention recently as a next generation communication technique. A standardization work is ongoing to support a WLAN communication protocol supported in such a communication environment. At present, the number of AIDs supported in the WLAN system may be not enough to be used in a WLAN system supporting an M2M application. When the M2M application is applied to this WLAN environment, the number of STAs associated with one AP may be too many. In such an environment, a situation may occur in which one AID is assigned to two or more STAs.

If the AID is assigned in an overlapping manner, the power save mode operation method based on the conventional TIM protocol may not be normally applied. For example, if there is buffered traffic for an STA assigned with '100' as an AID and the AP reports this to the STA, all STAs assigned with '100' as AIDs transmit a poll frame to request the AP to transmit a frame. In this case, there is no problem in an STA that actually has buffered traffic and thus will transmit a data frame. However, an operation thereof is not defined for the remaining STAs, and thus an additional definition for this is required.

Figure 6:
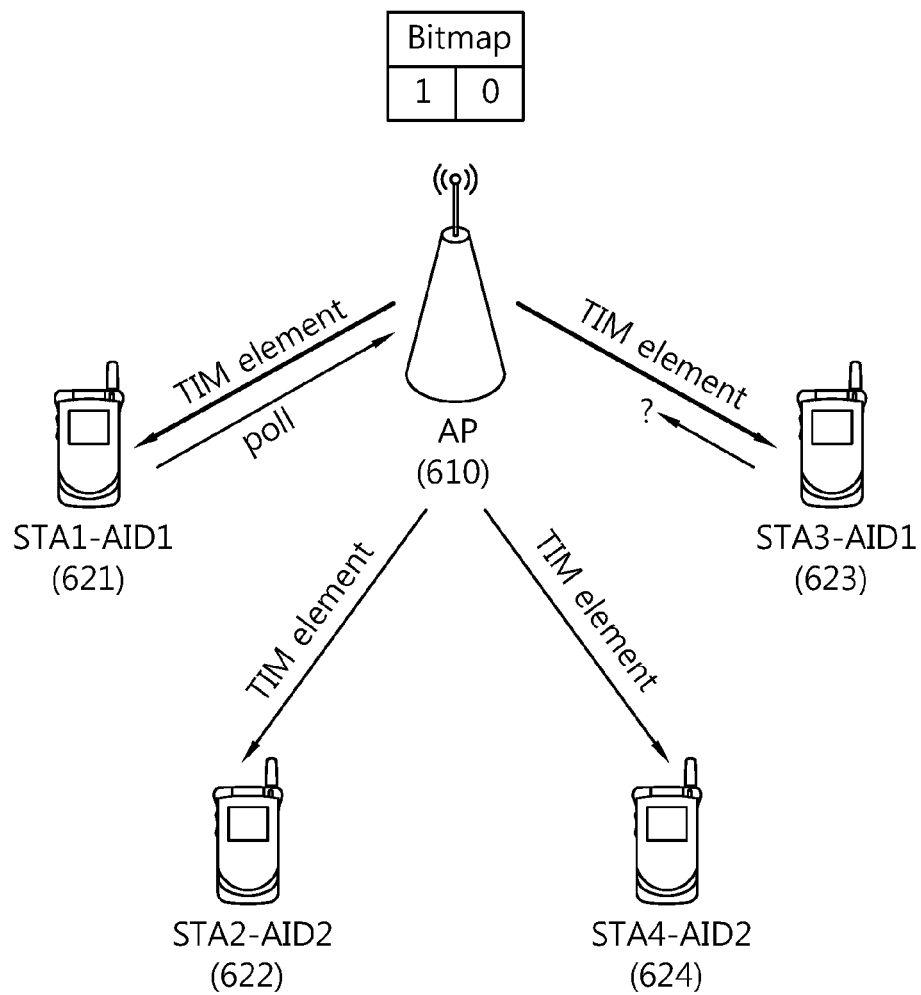
FIG. 6 shows an example of a WLAN system to which an M2M application is applied.

FIG. 6 shows an example of a WLAN system to which an M2M application is applied.

Referring to FIG. 6, an AP 610 is associated with an STA1 621, an STA2 622, an STA3 623, and an STA4 624. The STA1 621 and the STA3 623 are assigned with '1' as their AID values, and the STA2 622 and the STA4 624 are assigned with '2' as their AID values. It is assumed that the STA1 621 is a buffered STA having buffered traffic and the STA2 622 is a non-buffered STA having no buffered traffic.

The AP 610 transmits a TIM element including STA identifying information that indicates that the STA assigned with the AID of 1 has buffered traffic. In this case, the STA identifying information can be set to a bit sequence '10' in a bitmap type as shown in FIG. 6.

Since the TIM element is transmitted by being included in a beacon frame to be broadcast, not only the STA1 621 but also the STA2 622, the STA3 623, and the STA4 624 can receive the TIM element. The STA2 622 and the STA4 624 assigned with the AID of 2 can use the STA identifying information to confirm that they have no buffered traffic and can operate by transitioning to a doze state.

Meanwhile, the STA1 621 and the STA3 623 assigned with '1' as their AIDs transmit a poll frame to request the AP 610 to transmit a frame. The AP 610 transmits a data frame to the STA1 621 having buffered traffic. Meanwhile, there is no buffered traffic for the STA3 623, and its operation procedure of the AP 610 is not defined. If the AP 610 ignores the poll frame transmitted by the STA3 623 and does not perform any operation, the STA3 623 determines that the transmitted poll frame is not normally received by the AP 610 and thus may continuously transmit the poll frame. This causes not only performance deterioration of the WLAN system but also unnecessary power consumption of the STA. Therefore, the power save mode operation method is required to compensate for the above problem of the WLAN system in which the overlapping assignment of the AID is allowed.

A TIM protocol for the power save mode operation is proposed in the WLAN system in which the overlapping assignment of the AID is allowed. Hereinafter, among STAs assigned with the same AID, an AP considers an STA having buffered traffic as a buffered STA, and considers an STA having no buffered traffic as a non-buffered STA.

Hereinafter, an STA1 is a buffered STA, and an STA2 is a non-buffered STA. It is assumed that the STA1 and the STA2 operate by transitioning to an awake state to receive a TIM element from an AP while operating in a doze state. It is also assumed that the STA1 and the STA2 have already received a TIM element including STA identifying information indicating their AIDs.

Figure 7:
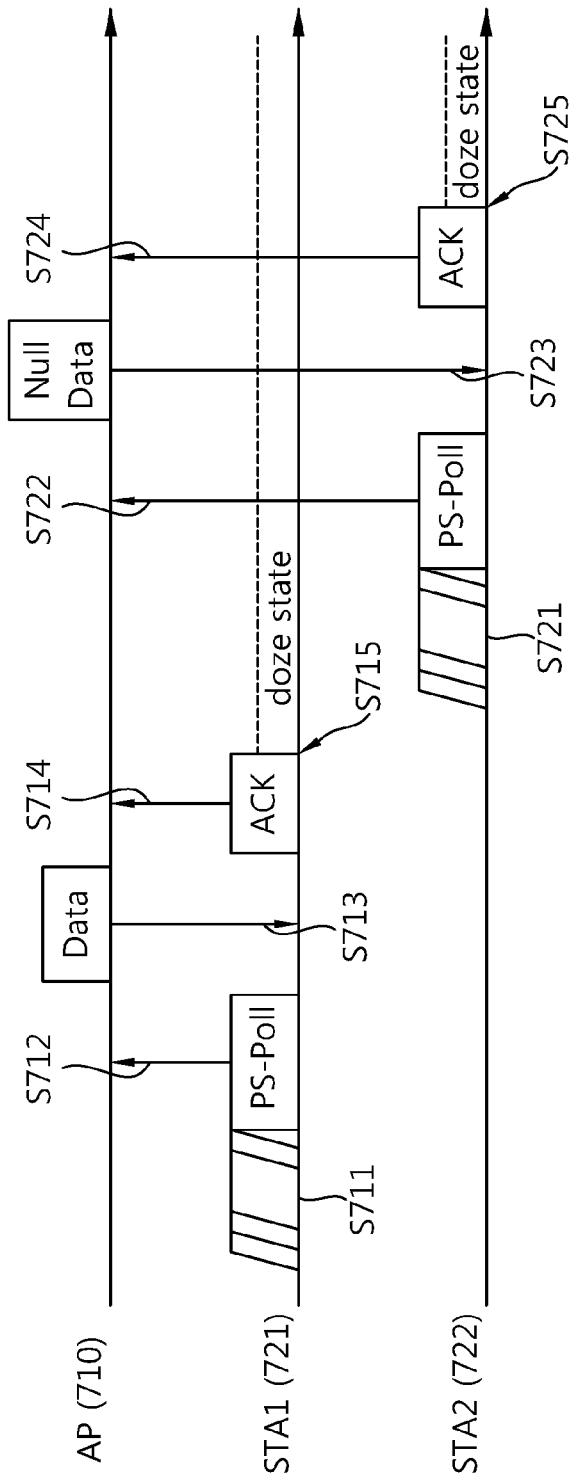
FIG. 7 is a flow diagram showing an example of a power save mode operation method according to an embodiment of the present invention.

FIG. 7 is a flow diagram showing an example of a power save mode operation method according to an embodiment of the present invention.

Referring to FIG. 7, an STA1 721 and an STA2 722 intend to transmit a PS-poll frame to an AP 710 in order to request the AP 710 to transmit a data frame for buffered traffic, and thus perform a contending step for radio medium access (step S711). First, the STA1 721 performs the contending step (step S711) to acquire a medium access right, and then the STA1 721 transmits the PS-poll frame to the AP 710 (step S712).

Upon receiving the PS-poll frame, the AP 710 determines whether an STA that has transmitted the PS-poll frame is an STA that will receive a data frame for buffered traffic. This can be determined according to whether AID information included in a MAC header of the PS-poll frame and a transmitter address, for example, a MAC address of an STA that has transmitted the PS-poll frame, are equal to those of the STA that will receive the data frame. Since the STA1 721 is a buffered STA, the AP 710 transmits the data frame to the STA1 721 (step S713).

The STA1 721 transmits an ACK frame to the AP 710 in response to the data frame (step S714), and operates by transitioning to a doze state (step S715).

Thereafter, although the STA2 722 is a non-buffered STA, since STA identifying information indicating its AID is included in a TIM element, the STA2 722 performs a contending step (step S721), and transmits a PS-poll frame to the AP 710 (step S722).

Upon receiving the PS-poll frame, although AID information included in a MAC header of the PS-poll frame is equal to AID information indicated by the STA identifying information included in the TIM element, since a transmitter address of the PS-poll frame is different from that of an STA that will receive a data frame, the AP 710 can confirm that the STA is not a target of data transmission. Therefore, the AP 710 transmits a PS-poll response frame to the STA2 722 in response to the PS-poll frame (step S723). In this case, the PS-poll response frame may be a null data frame.

Even if the null data frame is received, the STA2 722 transmits an ACK frame to the AP 710 in response thereto (step S724), and operates by transitioning to the doze state (step S725).

Although the number of STAs having the same AID is limited to two in FIG. 7, the number of STAs is not limited thereto, and a TIM protocol procedure of one cycle can be complete through a process in which each of all STAs transmits a PS-poll frame and receives a data frame or a null data frame. According to the power save mode operation method based on the TIM protocol procedure, a procedure for a non-buffered STA can be defined even in a situation where an AID is assigned in an overlapping manner.

Figure 8:
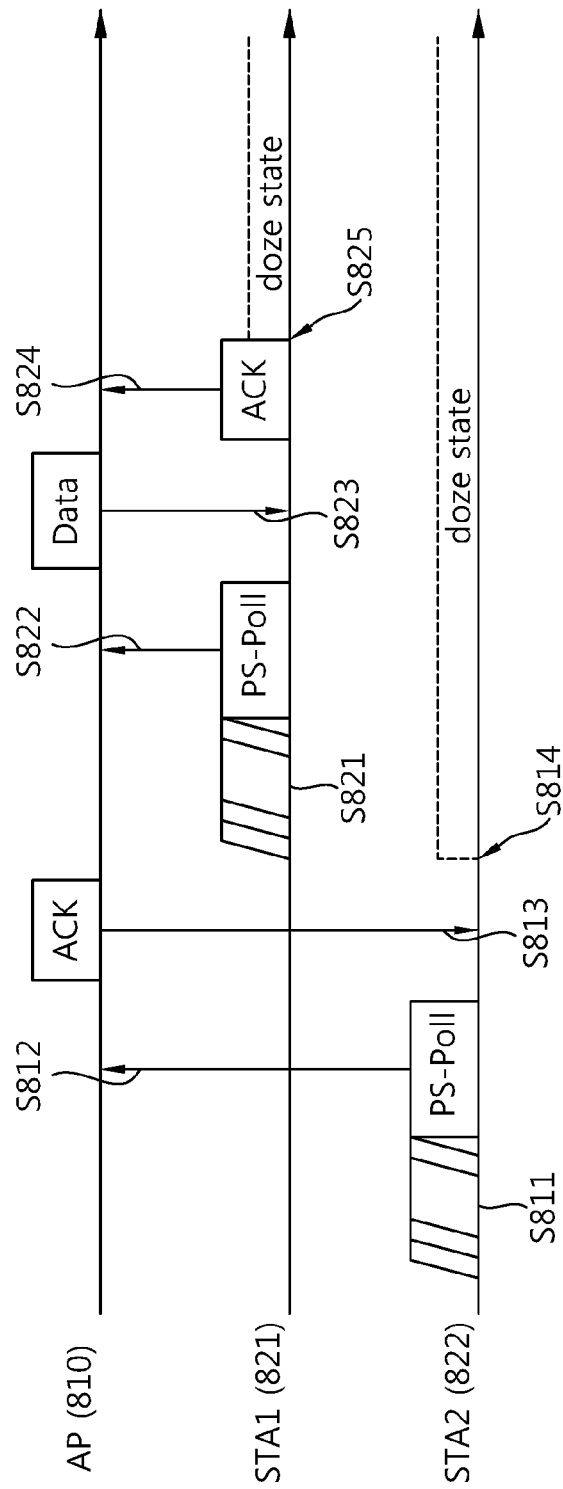
FIG. 8 shows another example of a power save mode operation according to an embodiment of the present invention.

FIG. 8 shows another example of a power save mode operation according to an embodiment of the present invention.

Referring to FIG. 8, although an STA2 822 is a non-buffered STA, since STA identifying information indicating its AID is included in a TIM element, the STA2 822 performs a contending step (step S811), and transmits a PS-poll frame to an AP 810 (step S812).

Upon receiving the PS-poll frame, although AID information included in a MAC header of the PS-poll frame is equal to AID information indicated by the STA identifying information included in the TIM element, since a transmitter address of the PS-poll frame is different from that of an STA that will receive a data frame, the AP 810 can confirm that the STA is not a target of data transmission. Therefore, the AP 810 transmits a PS-poll response frame to the STA2 822 in response to the PS-poll frame (step S813). In this case, the PS-poll response frame may be an ACK frame.

Upon receiving the ACK frame, the STA2 822 operates by transitioning to a doze state (step S814). This is different from a case of FIG. 7 in which the STA2 722 receives the null data frame as the PS-poll response frame, transmits the ACK frame to the AP 710 in response thereto, and thereafter transitions to the doze state.

An STA1 821 performs a contending step (step S821) to acquire a medium access right and then transmits a PS-poll frame to the AP 810 (step S822).

Upon receiving the PS-poll frame, the AP 810 determines to transmit a data frame to the STA1 821 by using a transmitter address and an AID included in a MAC header of the PS-poll frame, and transmits the data frame to the STA1 821 (step S823).

The STA1 821 transmits an ACK frame to the AP 810 in response to the data frame (step S824), and operates by transitioning to the doze state (step S825).

In the power save mode operation method based on the method of FIG. 8, the response procedure of FIG. 4 cannot be applied. On the other hand, instead of transmitting a null data frame in FIG. 7, an ACK frame can be transmitted, and an STA receiving the ACK frame can directly transition to the doze state and thus can decrease power consumption of a non-buffered STA and can improve efficiency of channel usage.

Meanwhile, regarding PS-poll frame transmission of STAs, a method can be proposed in which an AP operates in association with an STA basically according to the response procedure of FIG. 4.

Figure 9:
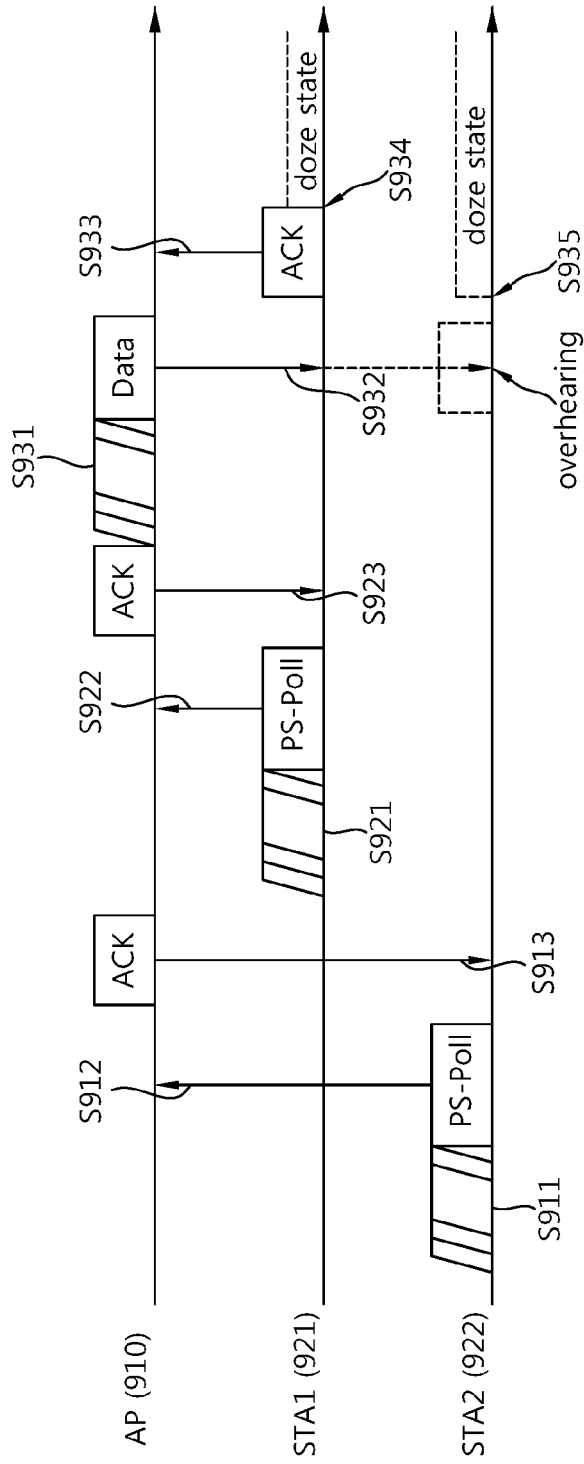
FIG. 9 shows a power save mode operation method according to another embodiment of the present invention.

FIG. 9 shows a power save mode operation method according to another embodiment of the present invention.

Referring to FIG. 9, although an STA2 922 is a non-buffered STA, since STA identifying information indicating its AID is included in a TIM element, the STA2 922 performs a contending step (step S911), and transmits a PS-poll frame to an AP 910 (step S912). The AP 910 transmits a PS-poll response frame to the STA2 922 in response to the PS-poll frame (step S913). In this case, the PS-poll response frame may be an ACK frame.

Since an STA1 921 is a buffered STA, the STA1 921 performs a contending step (step S921), and transmits a PS-poll frame to the AP 910 (step S922). The AP 910 transmits an ACK frame to the STA1 921 in response to the PS-poll frame (step S923). Upon receiving the ACK frame, the STA1 921 and the STA2 922 operate while maintaining an awake state.

The AP 910 performs a contending step to transmit a data frame to the STA1 921 (step S931), and transmits the data frame to the STA1 921 (step S932). The STA1 921 transmits an ACK frame to the AP 910 in response to the data frame (step S933), and operates by transitioning to the doze state (step S934). Meanwhile, since AID information is included in a data frame, STA2 922, which is a non-buffered STA, overhears the data frame. However, the STA2 922 can confirm that it is a non-buffered STA by using receiver address information of the data frame, and operates by transitioning to the doze state (step S935).

The power save mode operation method of FIG. 9 can be applied in a case where the data frame to be transmitted is not prepared when the AP receives the PS-poll frame.

Figure 10:
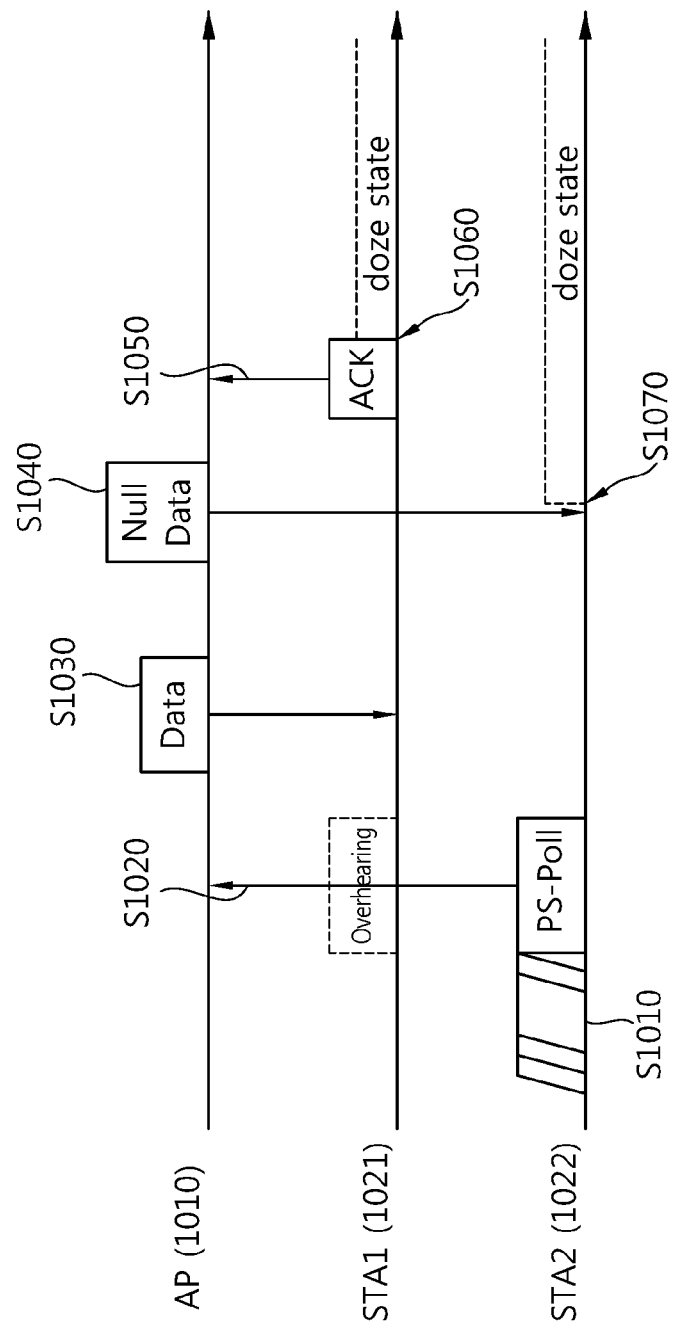
FIG. 10 shows an example of a power save mode operation according to another embodiment of the present invention.

FIG. 10 shows an example of a power save mode operation according to another embodiment of the present invention.

Referring to FIG. 10, an STA2 1020 performs contending step (step S1010), and transmits a PS-poll frame to an AP 1010 (step S1020). In this case, an STA1 1021 can overhear a PS-poll frame transmitted by the STA2 1022 and thus can know that the AP 1010 is scheduled to transmit a data frame or a PS-poll response frame.

Although the AP 1010 receives the PS-poll frame from the STA2 1022 which is a non-buffered STA, the AP 1010 transmits the data frame to the STA1 1021 (step S1030). Subsequently, a null data frame is broadcast/multicast as a PS-poll response frame. In this case, the STA1 1020 which is a buffered STA cannot transmit the PS-poll frame since a channel access right is not attained in the contenting step or the like. However, the STA1 1020 can receive a data frame from the AP 1010 since a channel is persistently scanned. Subsequently, the STA1 1021 transmits an ACK frame to the AP 1010 in response to the data frame (step S1040), and operates by transitioning to the doze state (step S1050).

Meanwhile, the STA2 1022 which is a non-buffered STA can receive a null data frame transmitted subsequently to the data frame and can know that the STA2 1022 is a non-buffered STA by using an AID and receiver address information included in the null data frame. Therefore, the STA2 1022 operates by directly transitioning to the doze state (step S1060).

The STA2 1022, non-buffered STA, cannot receive the data frame. However, since the null data frame is broadcasted, the non-buffered STA can receive the null data frame. The non-buffered STA can decode the null data frame.

Figure 11:
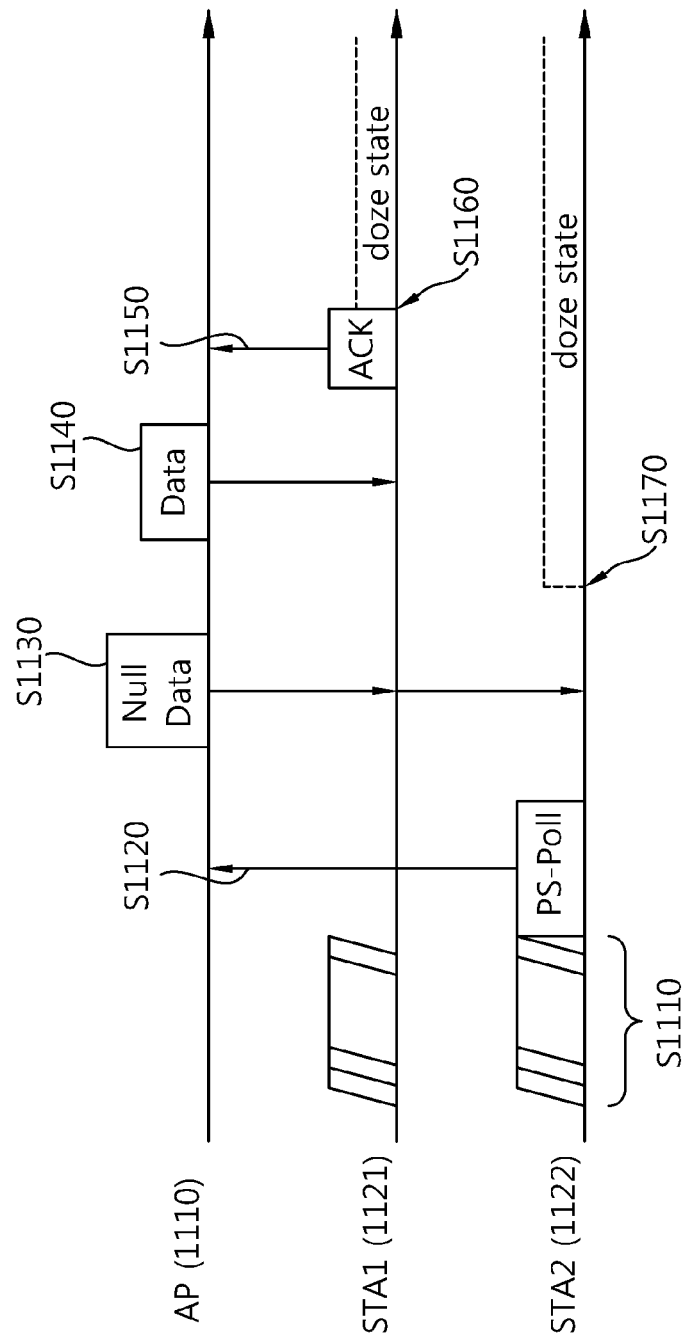
FIG. 11 is a flow diagram showing another example of a power save mode operation method according to another embodiment of the present invention.

FIG. 11 is a flow diagram showing another example of a power save mode operation method according to another embodiment of the present invention.

Referring to FIG. 11, an STA1 1121 and an STA2 1122 perform a contending step to transmit a PS-poll frame (step S1110). An STA which acquires a channel access right through the contending transmits the PS-poll frame to an AP 1110. Although it is shown in FIG. 11 that the STA2 1122 transmits the PS-poll frame to the AP 1110, this is for exemplary purposes only, and thus the STA1 1121 can transmit the PS-poll frame upon acquiring of the channel access right. In addition, the STA1 1121 which fails to acquire the channel access right through the contending can overhear the PS-poll frame transmitted by the STA2 1122 and thus can know that a data frame is scheduled to be transmitted as in the example of FIG. 10.

The AP 1110 broadcasts a null data frame as a PS-poll response frame in response to the PS-poll frame (step S1130). Subsequently, the data frame is transmitted to the STA1 1121 which is a buffered STA (step S1140).

The STA1 1121 transmits an ACK frame to the AP 1110 in response to the data frame (step S1150), and operates by transitioning to a doze state (step S1160).

The STA2 1122 receives the null data frame, and can know that the STA2 1122 is a non-buffered STA by using an AID and receiver address information included in the null data frame, and operates by transitioning to the doze state (step S1170).

According to the power save mode operation method of FIG. 11, the non-buffered STA can transition to the doze state at a relatively faster speed in comparison with the method of FIG. 10. In addition, advantageously, the conventional frame exchange protocol is directly applied in which a buffered STA receives a data frame and transmits an ACK frame at the elapse of short interframe space (SIFS). This method is effective in terms of power consumption or channel usage efficiency in a sense that a plurality of STAs do not transmit respective PS-poll frames.

Figure 12:
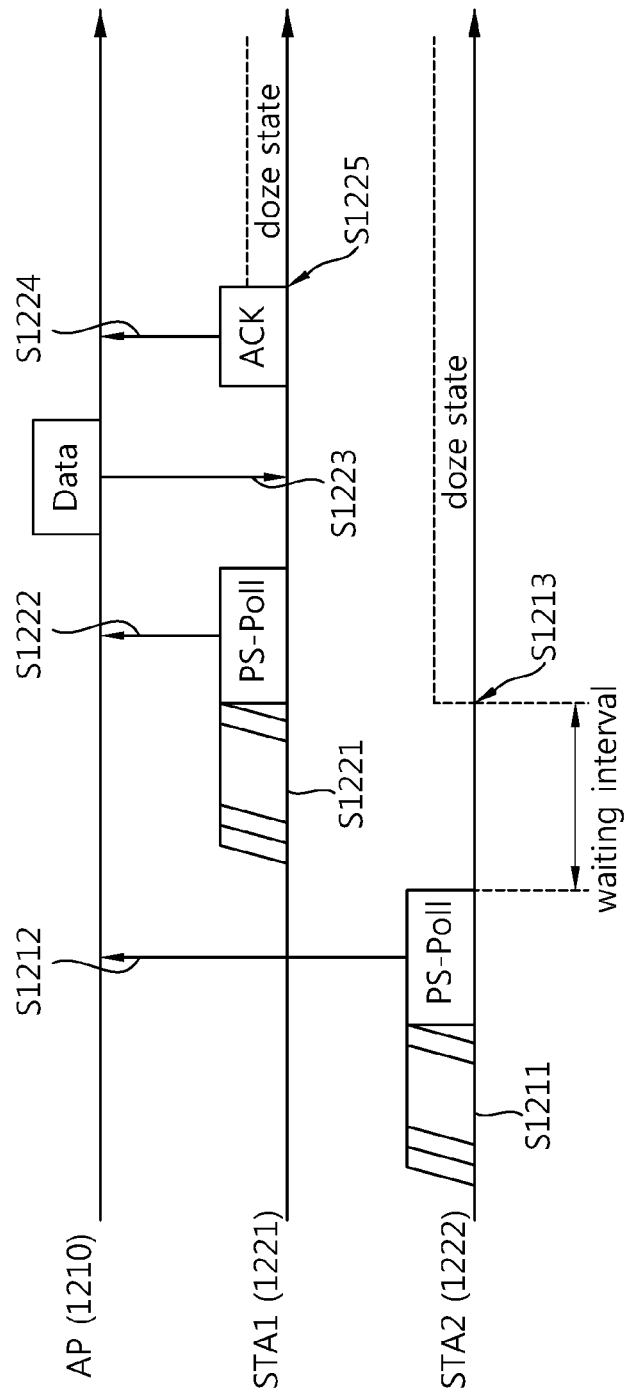
FIG. 12 is a flow diagram showing a power save mode operation method according to another embodiment of the present invention.

FIG. 12 is a flow diagram showing a power save mode operation method according to another embodiment of the present invention.

Referring to FIG. 12, an STA2 1222 performs a contending step (step S1211), and transmits a PS-poll frame to an AP 1210 (step S1212). Although the AP 1210 receives the PS-poll frame of the STA2 1222, the AP 1210 can know that the STA2 1222 is a non-buffered STA by using an AID and transmitter address included in the PS-poll frame, and does not perform an operation corresponding thereto.

An STA1 1221 performs a contending step after the completion of channel access of the STA2 1222 (step S1221), and transmits a PS-poll frame (step S1222). The AP 1210 can know that the STA1 1221 is a buffered STA by using the AID and transmitter address included in the PS-poll frame. Therefore, the AP 1210 transmits a data frame to the STA1 1221 (step S1223). The STA1 1221 transmits an ACK frame to the AP 1210 in response to the data frame (step S1224), and operates by transitioning to a doze state (step S1225).

Since there is no response for the transmitted PS-poll frame from the AP 1210, the STA2 1222 waits while maintaining an awake state, and if it fails to receive a data frame and/or a PS-poll response frame from the AP 1210 within a predetermined waiting interval, considers itself as a non-buffered STA and operates by transitioning to the doze state (step S1213).

In the embodiments of the present invention described in FIG. 7 and FIG. 12, respective steps of the power save mode operation method can be used by combining them. The scope of the present invention includes the combinations of the respective steps constituting the embodiments of FIG. 4 and FIG. 12. Although it has been described above in FIG. 7 and FIG. 12 that one buffered STA and one non-buffered STA are used for example, the number of STAs is not limited thereto, and when the number of STAs is increased, the power save mode operation method can be performed by repetitively performing each step.

Figure 13:
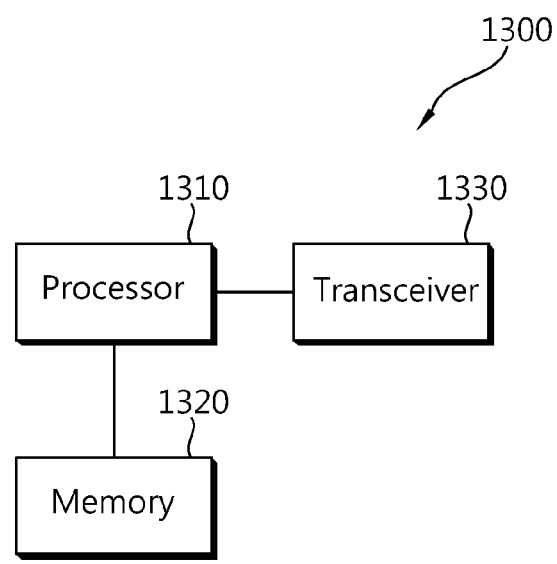
FIG. 13 is a block diagram showing a wireless apparatus according to an embodiment of the present invention.

FIG. 13 is a block diagram showing a wireless apparatus according to an embodiment of the present invention.

Referring to FIG. 13, a wireless apparatus 1300 includes a processor 1310, a memory 1320, and a transceiver 1330. The transceiver 1330 transmits and/or receives a radio signal, and implements an IEEE 802.11 physical (PHY) layer. The processor 1310 functionally coupled to the transceiver 1330 is configured to implement a MAC layer and/or a PHY layer for implementing embodiments of the present invention shown in FIG. 2 to FIG. 12 in which a TIM element is transmitted and received, a PS-poll frame is transmitted and received, and then a data frame is transmitted and received by confirming whether an STA is a buffered STA or a non-buffered STA. The processor 1310 can be configured to be able to determine whether to operate in a doze state or an awake state by interpreting the received data frame or a PS-poll response frame.

The processor 1310 and/or the transceiver 1330 may include an application-specific integrated circuit (ASIC), a separate chipset, a logic circuit, and/or a data processing unit. When the embodiment of the present invention is implemented in software, the aforementioned methods can be implemented with a module (i.e., process, function, etc.) for performing the aforementioned functions. The module may be stored in the memory 1320 and may be performed by the processor 1310. The memory 1320 may be located inside or outside the processor 1310, and may be coupled to the processor 1310 by using various well-known means.

The invention claimed is:

1. A method for a power save mode operation in a wireless local area network (WLAN) system, the method comprising:
   transmitting, by an access point (AP), a traffic indication map (TIM) element that announces the existence of buffered traffic, wherein the TIM element includes an association ID (AID) assigned to a buffered STA having the buffered traffic when the buffered station (STA) is associated with the AP;
   receiving, by the AP, a poll frame for requesting data frame transmission from a candidate STA, wherein the poll frame contains an AID of the candidate STA and a medium access control (MAC) address which is unique identifying information of the candidate STA;
   determining, by the AP, whether the candidate STA is the buffered STA on the basis of the AID and the MAC address of the candidate STA; and
   transmitting, by the AP, a poll response frame to the candidate STA in response to the poll frame when the candidate STA is not the buffered STA.

2. The method of claim 1, further comprising, if the candidate STA is the buffered STA, transmitting, by the AP, the data frame for the buffered frame to the candidate STA in response to the poll frame.

3. The method of claim 2, further comprising, upon receiving the poll response frame from the AP, operating, by the candidate STA, by transitioning to a doze state.

4. The method of claim 3, further comprising, upon receiving the data frame from the AP,
   transmitting, by the candidate STA, an acknowledgement (ACK) frame in response to the data frame, and,
   operating, by the candidate STA, by tr transitioning to the doze state.

5. The method of claim 1, wherein the poll response frame is an ACK frame for the poll frame.

6. The method of claim 1, wherein the poll response frame is a null data frame.

7. A wireless apparatus comprising:
   a transceiver for transmitting and receiving a radio signal; and
   a processor operably coupled to the transceiver, wherein the processor is configured for:
   transmitting a traffic indication map (TIM) element that announces the existence of buffered traffic, wherein the TIM element includes an association ID (AID) assigned to a buffered STA having the buffered traffic when the buffered station (STA) is associated with the wireless apparatus;
   receiving a poll frame for requesting data frame transmission from a candidate STA, wherein the poll frame contains an AID of the candidate STA and a medium access control (MAC) address which is unique identifying information of the candidate STA;
   determining whether the candidate STA is the buffered STA on the basis of the AID and the MAC address of the candidate STA; and
   transmitting a poll response frame for the poll frame to the candidate STA when the candidate STA is not the buffered STA.

8. The wireless apparatus of claim 7, wherein if the candidate STA is the buffered STA, the processor is further configured for transmitting the data frame for the buffered frame to the candidate STA in response to the poll frame.

9. A method for a power save mode operation in a wireless local area network (WLAN) system, the method comprising:
   receiving, by a station (STA), a traffic indication map (TIM) element that announces the existence of buffered traffic, wherein the TIM element includes an association ID (AID) assigned to a buffered STA having the buffered traffic when the buffered STA is associated with an access point (AP);

if an AID of the STA is equal to the AID of the TIM element, transmitting, by the STA, a poll frame to the AP in response to the TIM element;

if the STA fails to receive any frame from the AP within a predetermined timeout interval after transmitting the poll frame, operating, by the STA, by transitioning to a doze state, and if the STA receives a poll response frame in response to the poll frame within the timeout interval, operating, by the STA, by transitioning to the doze state.

10. The method of claim 9, further comprising, if the STA receives a data frame in response to the poll frame within the timeout interval, transmitting, by the STA, an ACK frame in response to the data frame, and, operating, by the STA, by transitioning to the doze state.

11. The method of claim 9, further comprising:

receiving, by the STA, a poll response frame in response to the poll frame, wherein the poll response frame includes a MAC address of the buffered STA; and if the MAC address of the buffered STA is different from that of the STA, operating, by the STA, by transitioning to the doze state.

12. The method of claim 11, further comprising, if the MAC address of the buffered STA is equal to that of the STA, receiving, by the STA, a data frame from the AP after receiving the poll response frame, and, operating, by the STA, by transitioning to the doze state.

\* \* \* \* \*